May 13, 1924.
W. PARKES
1,493,866
CINEMATOGRAPH FILM DEVELOPING APPARATUS
Original Filed Sept. 11, 1919   2 Sheets-Sheet 1
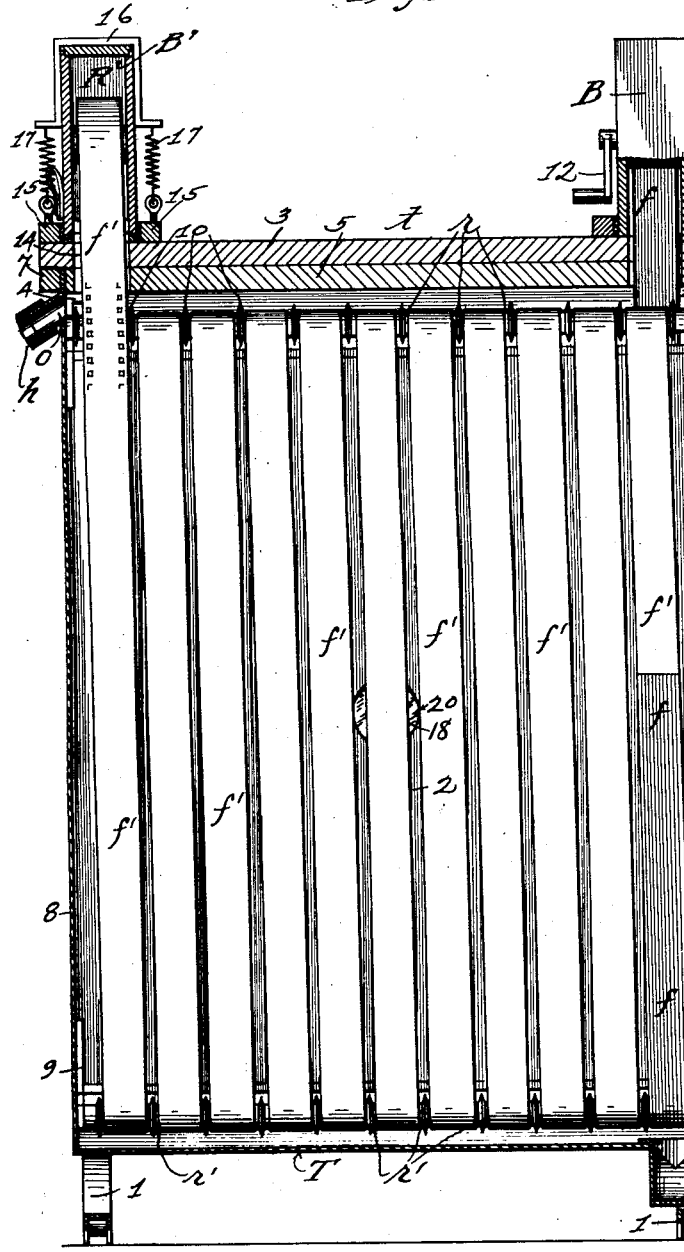
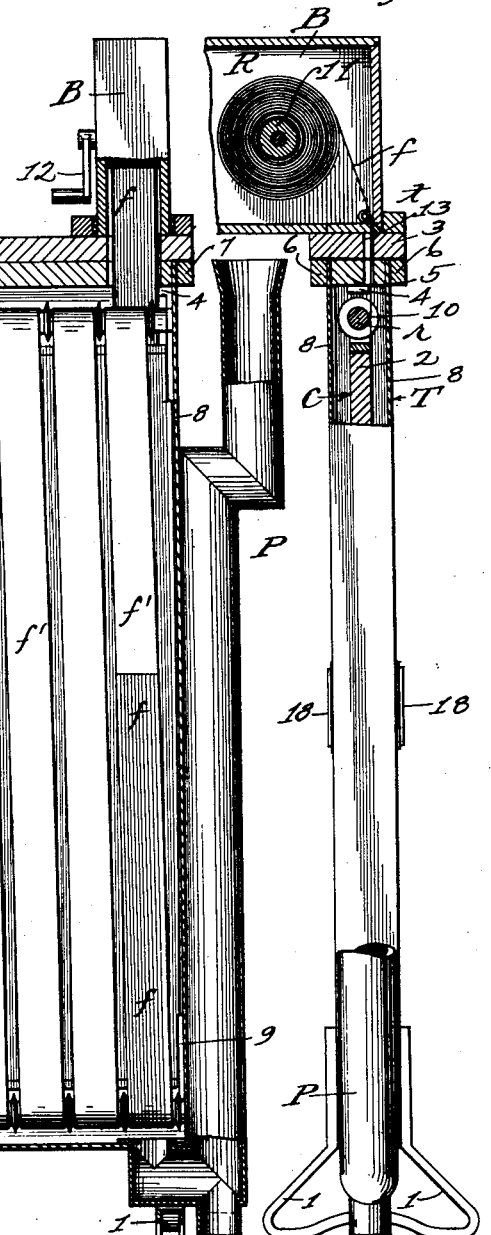
INVENTOR:
Walter Parkes

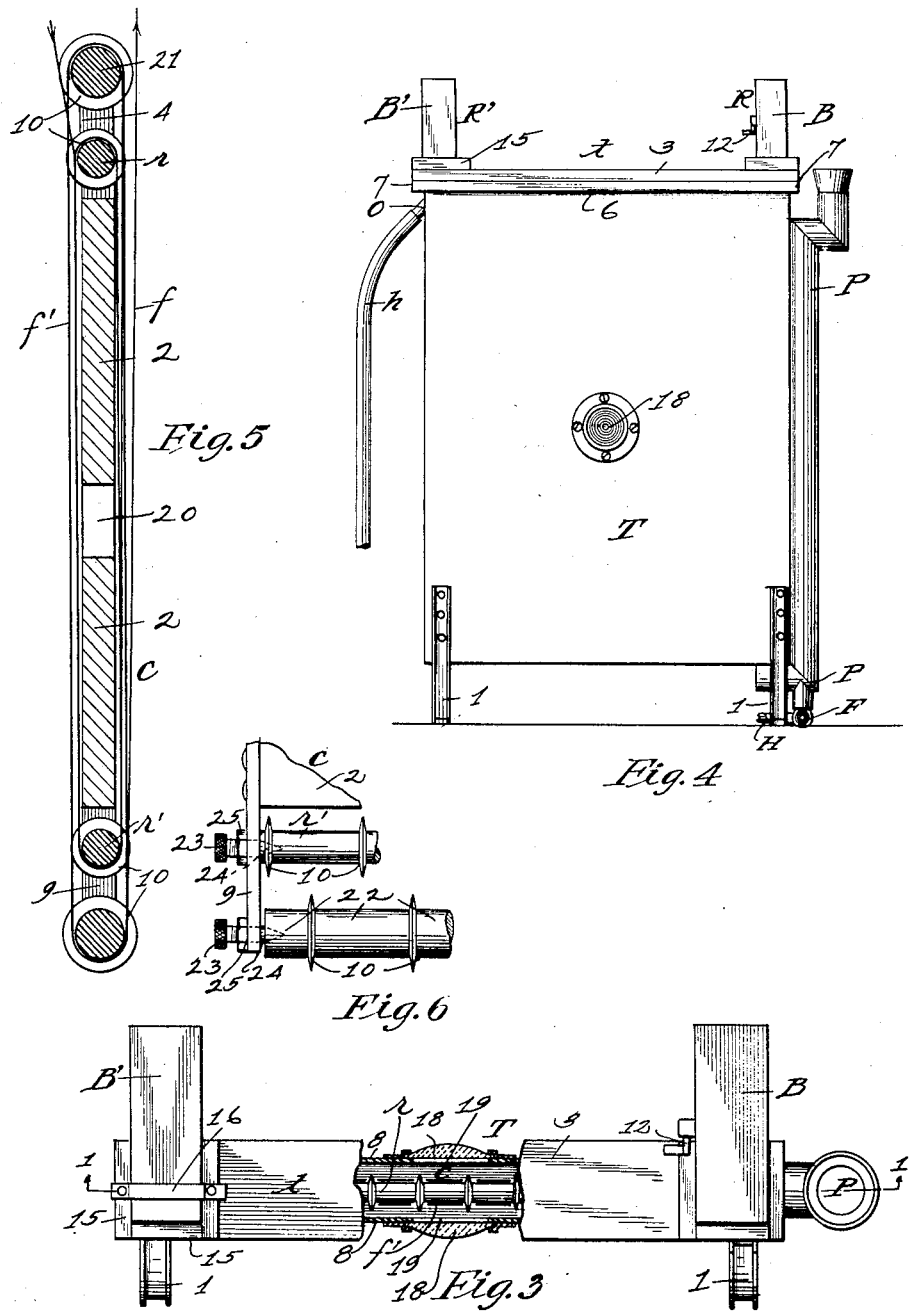

Patented May 13, 1924.

1,493,866

UNITED STATES PATENT OFFICE.

WALTER PARKES, OF OAKLAND, CALIFORNIA.

CINEMATOGRAPH-FILM-DEVELOPING APPARATUS.

Application filed September 11, 1919, Serial No. 324,233. Renewed January 24, 1923. Serial No. 549,923.

*To all whom it may concern:*

Be it known that I, WALTER PARKES, a citizen of the United States, and a resident of Oakland, in the county of Alameda and State of California, have invented new and useful Improvements in Cinematograph-Film-Developing Apparatus, of which the following is a specification.

This invention relates to and has for its principal object the provision of a portable daylight developing device for motion picture films and the like by means of which films exposed at locations remote from the studio may be developed on the spot within a short time and the character of the same ascertained before the location is changed and the properties removed to other places, thus obviating a great amount of expensive retakings, often times and facilitating the production of the pictures.

It has heretofore been impracticable to develop the motion picture films in the daylight, dark rooms at the studio being provided for this purpose, and all films are des-patched to the developing rooms and the properties held in readiness for a retaking of the picture in the event of an unsatisfactory result. Such retakings are expensive and substantially delay the productions, and it is an object of my invention to provide an apparatus which will overcome all of the difficulties mentioned and permit the quick developing of the film in the daylight on the location.

Another object is to provide a developing tank having a removable core with film feeding and receiving reels thereon by means of which the exposed film may be led into the tank without exposure to the light and readily removed therefrom after the developing operation.

A further object is to provide in connection with a developing tank a reel of old or developed film or other like material carried on a reel attached to the removable core of the developer and adapted to feed into and out of the tank, when closed to the light, so that a new exposed and undeveloped film may be attached to the end thereof and thus fed into the tank for development.

A still further object is to provide in a device of the character mentioned, a tank having opposite dark transparent elements, or lenses in the sides of the developing tank, and a corresponding aperture in the removable core by means of which the character of the film may be ascertained in the developing operation.

Another object is to provide means for operably attaching the usual film reels of motion picture cameras to the removable core, so that the exposed film may be played out to the film supporting means within the tank.

A feature object is to provide means on the removable core and adapted to be supported within the tank for supporting a maximum length of film for development at a single operation. Other objects may appear as the description progresses.

Referring to the drawings forming a part of this application and appended hereto:

Fig. 1 is a vertical section of my apparatus on line 1—1 of Fig. 3;

Fig. 2 is a side elevation of the same, partly in section;

Fig. 3 is a plan of the same, partly in section;

Fig. 4 is a front elevation of the same;

Fig. 5 is a vertical section of the removable core showing double film carrying rolls in lieu of the single rolls shown in Fig. 1;

Fig. 6 is a fragmentary face view of the form of core shown in Fig. 5;

Similar characters of reference indicate the same and like parts throughout the specification and the several views of the drawings.

My improved apparatus includes a developing tank T, for holding the developing solutions, a removable core C, adapted to be suspended within the tank during the developing operation, a top, or cover *t* preferably attached in a permanent manner to the core C, a permanent feeding reel R, carried on said top, and a removable camera reel R' also carried on said top.

Tank T is of rectangular cross section and has legs 1, 1, on the bottom thereof by means of which the tank may be held at a suitable distance above the floor or ground, and a supply or inlet pipe P is attached to one edge of the tank and has several right angular turns in its length so as to completely exclude the daylight which might otherwise gain admission to the tank through the pipe. It will be observed that the pipe P opens into the tank T at the bottom and a suitable faucet F may be provided on the lower end of the pipe, as shown, for draining off the contents of the pipe and tank. Said faucet remains closed during the developing operation, but in order to conserve the supply of chemicals the liquids may be drained off through faucet F and a hose H attached thereto into suitable vessels for use in a subsequent operation. An overflow pipe, or outlet O is provided at one edge and near the top of the tank and may be connected with a hose H, as shown, so that in the washing operation, fresh water may be supplied through pipe P and drained off through hose H to a point remote from the tank.

The removable core C includes a wooden slab 2, attached to and depending from the top member 3, by means of metal straps 4, 4, at the sides, or otherwise. Member 3 of the top extends outwardly from the sides and edges of the tank T and has a false top member 5, on the lower side thereof adapted to closely fit the interior of the tank, while cleats 6, 6, on the sides and 7, 7, on the ends are provided around the outer edges of the member 3, and are adapted to be spaced from the ends and sides of the false top member 5 a distance corresponding to the thickness of the tank walls 8. Thus the top may be placed in position over the upper edges of the tank, as shown, and felt or the like may be interposed in the usual manner at the joints if desired in order to exclude the daylight from the tank T.

Core C has a series of upper film carrying rolls r, r, etc., supported in axial alinement above the upper edge of the core slab 2 and carried on the metal core supporting straps 4, 4, at the ends. A lower series of rolls r' is supported at the bottom of slab 2 on metal straps 9, 9, at the opposite sides of slab 2, the rollers of the upper and lower sets being staggered with respect to each other for purposes to be hereinafter described. Tapered flanges 10, 10, etc., are provided at regular intervals on both upper and lower rollers so that the film may be held at spaced distances apart.

A permanent film carrying box B is attached to one end of the top member 3 and the feeding reel R is held therein on a core 11, which is adapted to be rotated by means of a crank 12, exterior of the casing. Reel R may have an old used film $f$ of a length slightly greater than the maximum capacity of the tank T in film feet and the inner end of film $f$ is adapted to be permanently attached to the core 11 of reel R. The outer end of the film $f$ is adapted to be fed through an aperture 13 in the top members 3 and 5, and thence downwardly, as shown, over the first of the bottom rolls $r'$; thence upwardly over the first of the top rolls $r$, and so on to the last rolls $r$ and $r'$ of the series. The end of the film $f$ is then extended through an aperture 14 in the opposite end of member 3 from aperture 13 and attached by suitable means to the projecting end of the exposed film $f'$, which is carried on reel R' in a box B', usually provided in and forming a part of the camera.

Box B' is then positioned on the upper side of top T, as shown, between cleats 15, 15, etc., and may be removably held in such position by a strap 16 and a pair of springs 17, 17, at the sides and attached to cleats 15, 15.

The top $t$ having been first properly fitted to and inserted in the tank T and the reel box B', positioned as described, the apparatus will be in readiness for use. The exposed film $f'$ is drawn into the tank T by turning the crank 12 of reel R in a reverse direction, thus rewinding the old used film $f$ on the core 11 of said reel and rewinding the exposed film $f'$ from reel R', the film $f'$ being fed inwardly from the first to the last of the rollers $r$ and $r'$ of the upper and lower series until all of said film is within the tank.

The developing chemicals are then supplied to the tank T through pipe P and drained off through faucet F for further use, after which water is supplied to the tank through pipe P and discharged through outlet O for thoroughly washing the film.

The developing operation may be closely observed from the exterior of the tank by means of a pair of dark lenses or glasses 18, 18, suitably mounted in opposite positions on the sides of the tank over apertures 19, 19, cut in the sides of the tank. A corresponding aperture 20 is provided in the core slab 2, which registers with said openings 19, 19, so that a light may be held in front of the opening at one side of the tank and the character of the film observed from the opposite side.

In lieu of the single series of rollers $r$ and $r'$ shown in Figs. 1 to 4, inclusive, additional upper and lower rollers 21 and 22, respectively, may be provided for enlarging the capacity of the developer without enlarging the size of the tank T. The extra series of rollers are positioned as shown above and below the rolls $r$ and $r'$, are spaced therefrom and are substantially larger in diameter than said primary rollers. As shown in Fig. 5, when the primary and secondary rollers are provided, the film $f'$ will be first wound or threaded on to the first series of rollers $r$—$r'$ and then from the last primary roller to the first of the extra rollers and thence to the end of the extra series. Such a system will double the capacity and not enlarge the tank T.

I prefer to support the rollers $r$, $r'$ 21 and 22 on pivot screws 23, 23, having conical points 24, 24, and lock nuts 25, 25, as shown in Fig. 6, so that the film may be easily wound on the rollers and all friction reduced to a minimum, but other suitable means of accomplishing the same results may be utilized in lieu of the method shown.

It will be understood that I do not limit myself to the particular form of device shown and described, except as I may be limited by the appended claims, for I have attempted to show and describe only one practical embodiment of my invention and I conceive it to be possible to substantially modify and alter the form of device, without departing from the spirit of my invention.

What I claim is:

1. A film developing apparatus including a light-proof receptacle, a film supporting core and cover removably attachable to said receptacle, a flexible element movable into said receptacle and over said core and adapted to be extended therefrom in attachment to an element to be treated, and means for simultaneously withdrawing said flexible element and drawing said element to be treated in said receptacle.

2. A film developing apparatus comprising a light-proof receptacle, spaced light-proof chambers in communication with said receptacle, film supporting and moving means in said receptacle, a primary film rotatably supported in one of said chambers and adapted to be moved through said receptacle and into another of said chambers, the film to be treated being adapted to be carried in said other chamber and attached to said primary film, whereby said film to be treated may be drawn into position in said receptacle.

3. A film developing apparatus comprising a light-proof receptacle, a light-proof chamber permanently communicating therewith, a primary film movably supported in said chamber, a second light-proof chamber removably positioned relative to and communicating with said receptacle, whereby a secondary film carried therein may be attached to said primary film, for moving said secondary film into position in said receptacle for development.

4. A film developing apparatus comprising a film receiving receptacle, spaced chambers communicating therewith, said receptacle and said chambers being light-proof, a primary flexible element movably supported in one of said chambers and adapted to be moved through and extended from said receptacle into said other chamber, whereby a secondary element held in said last mentioned chamber may be atttached to said primary element, so that the withdrawal of said primary element will effect the advance of said secondary element into the receptacle for treatment.

5. A film developing apparatus comprising a receptacle, a light-proof cover therefor, rotatable means suspended into and held at the top and bottom of said receptacle for movably supporting a film to be treated therein, and means for supplying chemicals to said receptacle for the treatment of said film.

6. A film developing apparatus comprising a receptacle, a light-proof cover therefor, rotatable means suspended into and held at the top and bottom of said receptacle for movably supporting a film to be treated therein, and means for supplying chemicals to said receptacle for the treatment of said film, whereby said chemicals may be drained from said receptacle for further use.

7. A film developing apparatus comprising a receptacle, a light-proof cover therefor, rollers at the top and bottom of said receptacle for vertically moving a film to be treated therein, means for supplying chemicals to said receptacle for the treatment of said film, means whereby said chemicals may be drained for further use, and means whereby a liquid may be circulated through said receptacle for washing said film.

8. A film developing apparatus comprising a light-proof receptacle, a series of film advancing rollers in the upper portion thereof, a similar series of rollers in the lower portion thereof and staggered with respect to said upper rollers, a primary film movable over said rollers and capable of extension from said receptacle for attachment to a secondary film to be treated therein.

9. A film developing apparatus comprising a receptacle having apertures oppositely formed in the sides thereof, a film supporting core within said receptacle having an aperture registering with the apertures in said receptacle, transparent elements covering said receptacle apertures, film supporting means on said core and means for moving a film into and out of said receptacle without exposure to the light.

Signed at Los Angeles, county of Los Angeles, and State of California, this 30th day of August, 1919.

WALTER PARKES.

In presence of—
 LUTHER L. MACK,
 H. M. BRUNDAGE.